(12) United States Patent
Miyanaga (10) Patent No.: US 12,346,648 B2
(45) Date of Patent: Jul. 1, 2025

(54) PAGE DISPLAY SPEED IMPROVEMENT PROCESSING SYSTEM

(71) Applicant: IDEAMAN'S INC, Tokyo (JP)

(72) Inventor: Kunihiko Miyanaga, Tokyo (JP)

(73) Assignee: IDEAMAN'S INC, Tokyo (JP)

( * ) Notice: Subject to any disclaimer, the term of this patent is extended or adjusted under 35 U.S.C. 154(b) by 0 days.

(21) Appl. No.: 18/729,101

(22) PCT Filed: Jan. 27, 2023

(86) PCT No.: PCT/JP2023/002645
§ 371 (c)(1),
(2) Date: Jul. 15, 2024

(87) PCT Pub. No.: WO2023/149372
PCT Pub. Date: Aug. 10, 2023

(65) Prior Publication Data
US 2025/0005259 A1  Jan. 2, 2025

(30) Foreign Application Priority Data
Feb. 3, 2022 (JP) ................................ 2022-015710

(51) Int. Cl.
*G06F 40/103* (2020.01)
(52) U.S. Cl.
CPC ................................. *G06F 40/103* (2020.01)
(58) Field of Classification Search
CPC .................................................. G06F 40/103
See application file for complete search history.

(56) References Cited

U.S. PATENT DOCUMENTS

| 6,128,623 A | 10/2000 | Mattis et al. |
| 2007/0198924 A1 | 8/2007 | Koike et al. |

(Continued)

FOREIGN PATENT DOCUMENTS

| JP | 2000-250841 | 9/2000 |
| JP | 2002-511616 | 4/2002 |

(Continued)

OTHER PUBLICATIONS

International Search Report issued in International Application No. PCT/JP2023/002645, Apr. 11, 2023, 5 pages w/translation.

(Continued)

*Primary Examiner* — Shahid K Khan
(74) *Attorney, Agent, or Firm* — HSML P.C.

(57) ABSTRACT

Improvement of display speed of a Web page itself that is provided for a viewer terminal from a Web server is enabled. A page display speed improvement processing apparatus that improves display speed of a Web page acquires resource information about at least one type of resource constituting a display speed improvement target Web page, from the Web server through communication with the Web server; determines a display-speed-related indicator for evaluating display speed of the whole display speed improvement target Web page based on time information related to the acquisition of the resource information; acquires the resource information about the at least one type of resource constituting the display speed improvement target Web page and communication performance information including acquisition time and transmission speed for each resource, and records the information in a recording unit, in a process of communication with the Web server; and simulates a response of the Web server in order to alter a specified candidate for display speed inhibiting factor for the at least one type of resource, based on recorded content of the (Continued)

23 RECORDING UNIT

| REQUESTED URL | HTTP REQUEST METHOD | HTTP RESPONSE STATUS CODE | HTTP RESPONSE HEADER | LATENCY (ms) | AVERAGE DATA RATE (byte/ms) | RESOURCE DATA FILE PATH |
|---|---|---|---|---|---|---|
| https://www.xxxxx.co.jp/index.html | GET | 200 | Content-Type: text/html Content-Encoding: GZIP | 80 | 10 | /resources/GET/www.xxxxx.co.jp/index.html |
| https://www.xxxxx.co.jp/sample.jpg?param=1 | GET | 200 | Content-Type: image/jpeg | 200 | 5 | /resources/GET/www.xxxxx.co.jp/sample~param=1.jpg | recording unit, in a reproduction processing process without connection to the Web server.

9 Claims, 5 Drawing Sheets

(56) References Cited

U.S. PATENT DOCUMENTS

| | | | | |
|---|---|---|---|---|
| 2011/0054878 A1* | 3/2011 | Zhang | ................ | G06F 11/3447 |
| | | | | 703/21 |
| 2013/0174015 A1* | 7/2013 | Jeff L | .................. | G06F 40/103 |
| | | | | 715/234 |
| 2019/0102362 A1* | 4/2019 | Orciuoli | ............... | G06F 40/103 |

FOREIGN PATENT DOCUMENTS

| | | | | |
|---|---|---|---|---|
| JP | 2013-105227 | | 5/2013 | |
| JP | 2014-229119 | | 12/2014 | |
| WO | WO-2015196414 A1 * | 12/2015 | ............. | G06F 16/00 |
| WO | WO-2016103057 A1 * | 6/2016 | ........... | G06F 9/4806 |

OTHER PUBLICATIONS

Written Opinion issued in International Application No. PCT/JP2023/002645, Apr. 11, 2023, 6 pages w/translation.

* cited by examiner

PAGE DISPLAY SPEED IMPROVEMENT PROCESSING SYSTEM

TECHNICAL FIELD

The present invention relates to a page display speed improvement processing apparatus and further relates to a page display speed improvement processing method and a page display speed improvement processing program.

BACKGROUND ART

With the worldwide spread of the Internet, a user can easily acquire various types of information (including data) from Web servers available on the Web (World Wide Web) via a terminal apparatus such as a mobile phone terminal and a computer terminal. The user can view the various types of information acquired from the Web servers with a Web browser, which is viewing software of the terminal apparatus (which may also be referred to as a viewer terminal).

In general, a Web server operates/manages a Web site which is specified by a uniform resource locator (URL). The Web server provides various types of information on the Web site for a viewer terminal to be viewed as a Web page. The Web page includes a plurality of types of resources, such as documents and images, in a form of being referred to, and the Web page can be viewed after a Web browser of a viewer terminal has finished loading these resources.

Since there is a tendency that, if display speed of a Web page on a viewer terminal is slow, a viewer is more likely to leave the Web site, it is desirable that the display speed of a Web page be as fast as possible.

For example, in Patent Literatures 1, 2, and 3, the following related background techniques are proposed. That is, Patent Literature 1 discloses that, on the Internet, performance of response to a Web client can be improved by caching data of Web content (storing cache data) at a Web proxy server (a cache server) which intermediates between a Web client and a Web server (storing cache data), and providing the data for the Web client (performing proxy response) (see, for example, paragraph [0002]).

Further, Patent Literature 2 discloses a page access method and a speed-up method of caching a WWW page by a cache system called a proxy upon a user's request, inquiring of the WWW server whether the WWW page is updated upon another user's request, and using the cached page in the proxy if the page is not updated (see, for example, FIG. 21 and paragraph [0008]).

Furthermore, Patent Literature 3 discloses that a major factor in limiting performance of the World Wide Web is the speed at which information can be provided from a Web server (40) to a client via the Internet (20), and in one configuration a cache is located in a proxy server (30) which logically intermediates between Web clients (10a and 10b) and the Web server (40) as shown in FIG. 1 (see, for example, FIG. 1, and paragraphs [0006] and [0007]).

RELATED ART LITERATURE

Patent Literature

Patent Literature 1: Japanese Patent Laid-Open No. 2013-105227
Patent Literature 2: Japanese Patent Laid-Open No. 2000-250841
Patent Literature 3: Japanese Translation of PCT International Application Publication No. 2002-511616

SUMMARY OF INVENTION

Problems to be Solved by the Invention

In Patent Literatures 1, 2, and 3 described above, however, a processing technique that enables the display speed of a Web page itself to be improved is not disclosed. In other words, Patent Literatures 1, 2, and 3 described above do not disclose a page display speed improvement processing technique that enables the display speed of a Web page to be improved by appropriately altering (changing) resources constituting a Web page provided for a viewer terminal from a Web server.

According to research by the applicant, if a plurality of types of resources constitute a Web page, and the number of resources is large, mutual relationships among the resources are complicated, which makes it difficult to predict an alteration result. It often occurs that, even if altering resources of a Web page with the intention to speed up display is theoretically correct, expected results cannot be obtained. As a result, it is difficult to, in order to prevent or reduce influence on an operating Web server, accurately measure display speed in a test before actual operation and appropriately alter resources constituting a Web page.

An object is to provide a page display speed improvement processing technique that enables the display speed of a Web page itself provided for a viewer terminal from a Web server to be improved while preventing or reducing influence on the operating Web server.

Means for Solving the Problems

In order to solve the above problem, a page display speed improvement processing apparatus of one aspect is a page display speed improvement processing apparatus that improves display speed of a Web page provided for a viewer terminal from a Web server, the page display speed improvement processing apparatus including a processor configured to:
  acquire resource information about at least one type of resource constituting a display speed improvement target Web page, from the Web server through communication with the Web server;
  determine a display-speed-related indicator for evaluating the display speed of the whole display speed improvement target Web page based on time information related to the acquisition of the resource information;
  acquire the resource information about the at least one type of resource constituting the display speed improvement target Web page and communication performance information including acquisition time and transmission speed for each resource, and record the resource information and the communication performance information in a recording unit, in a process of communication with the Web server; and
  simulate a response of the Web server in order to alter a specified candidate for display speed inhibiting factor for the at least one type of resource, based on recorded content of the recording unit, in a reproduction processing process without connection to the Web server.

A page display speed improvement processing apparatus of another aspect is a page display speed improvement processing apparatus that improves display speed of a Web page provided for a viewer terminal from a Web server, the page display speed improvement processing apparatus including:

- a measurement processing unit that acquires resource information about at least one type of resource constituting a display speed improvement target Web page, from the Web server through communication with the Web server, and determines a display-speed-related indicator for evaluating the display speed of the whole display speed improvement target Web page based on time information related to the acquisition of the resource information;
- a recording proxy unit that acquires the resource information about the at least one type of resource constituting the display speed improvement target Web page and communication performance information including acquisition time and transmission speed for each resource, and records the resource information and the communication performance information in a recording unit, in a process of communication with the Web server by the measurement processing unit;
- a recording unit that records the resource information and the communication performance information via the recording proxy unit; and
- a reproduction proxy unit that simulates a response of the Web server in cooperation with the measurement processing unit in order to alter a specified candidate for display speed inhibiting factor for the at least one type of resource, based on recorded content of the recording unit, in a reproduction processing process without connection to the Web server.

In another aspect described above, the measurement processing unit includes a Web browser and at least one benchmark program;

- the at least one benchmark program instructs the Web browser to load the display speed improvement target Web page,
- the Web browser acquires the resource information about the at least one type of resource constituting the display speed improvement target Web page from the Web server through communication with the Web server via the recording proxy unit, and
- the at least one benchmark program determines the display-speed-related indicator for evaluating the display speed of the whole display speed improvement target Web page based on the time information related to the acquisition of the resource information.

In another aspect described above, when the measurement processing unit includes a plurality of benchmark programs, predefined benchmark programs work in cooperation with the Web browser.

In each of the aspects described above, when the display speed improvement target Web page includes a plurality of types of resources, the plurality of types of resources include at least two or more among a document written in a predetermined markup language, information on setting a style of the Web page, a program specifying actions, and an image.

The features of the page display speed improvement processing apparatus of each of the aspects described above may be implemented as a page display speed improvement processing method. Further, these features may be implemented as a page display speed improvement processing program that causes a processor or the like to perform the page display speed improvement processing method.

Effects of the Invention

According to the disclosed technique, it is possible to provide a page display speed improvement processing technique that enables the display speed of a Web page itself provided for a viewer terminal from a Web server to be improved while preventing or reducing influence on the operating Web server.

Other objects, features, and advantages will become clear by reading the description of embodiments described below, in conjunction with drawings and the claims.

MODE FOR CARRYING OUT THE INVENTION

A detailed description will be made below with reference to accompanying drawings. A preferred embodiment is shown in the drawings. The invention, however, can be practiced in a plurality of different embodiments and is not limited to the embodiment described in the present specification.

[Page Display Speed Improvement Processing System]

Figure 1:
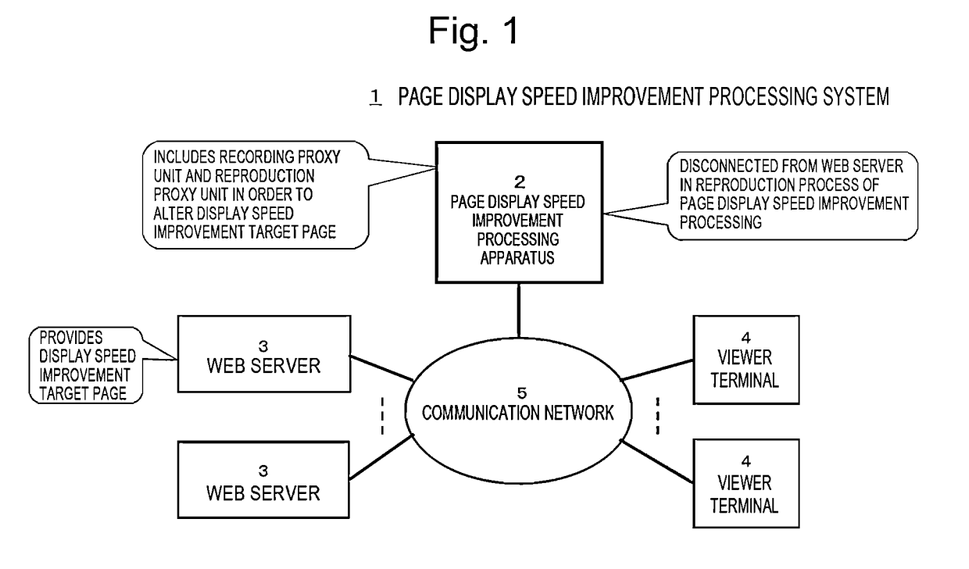
FIG. 1 is a diagram illustrating a configuration of a page display speed improvement processing system according to one embodiment.

Referring to FIG. 1 showing a system configuration according to one embodiment, a page display speed improvement processing system 1 includes a page display speed improvement processing apparatus 2, a plurality of Web (World Wide Web) servers 3, a plurality of viewer terminals 4, and a communication network 5.

The communication network 5 enables wireless and wired data communication, and is configured with an internet protocol (IP) network such as the Internet, and accommodates each of the page display speed improvement processing apparatus 2, the plurality of Web servers 3, and the plurality of viewer terminals 4. In the description below, intermediation of the communication network 5 will be omitted unless the description becomes unclear.

In general, each Web server 3 operates/manages a Web site which is specified with a uniform resource locator (URL) The Web server 3 provides various types of information (including data) on the Web site, for a viewer terminal 4 upon request, to be viewed (referred to) as a Web page or individual resource. Communication between the Web servers 3 and the viewer terminal 4 is performed in accordance with a predetermined protocol (communication rules), i.e., the Hyper Text Transfer Protocol (HTTP).

A viewer, i.e. a user, can acquire a desired Web page and resources from any of the Web servers 3 available on the Web (World Wide Web) via a viewer terminal 4 having a wired and wireless data communication function, such as a mobile phone terminal including a smartphone and a computer terminal including a personal computer and a tablet terminal.

A Web page includes a plurality of types of resources, such as documents and images, in a form of being referred to, and a viewer can view a desired Web page in a Web browser, which is viewing software of the viewer terminal 4, after the Web browser has finished loading these resources.

In the page display speed improvement processing system 1, the page display speed improvement processing apparatus 2 is provided to improve the display speed of Web pages provided for the viewer terminals 4 from the Web servers 3, which is operating/managing Web sites, as described later in detail.

Figure 2:
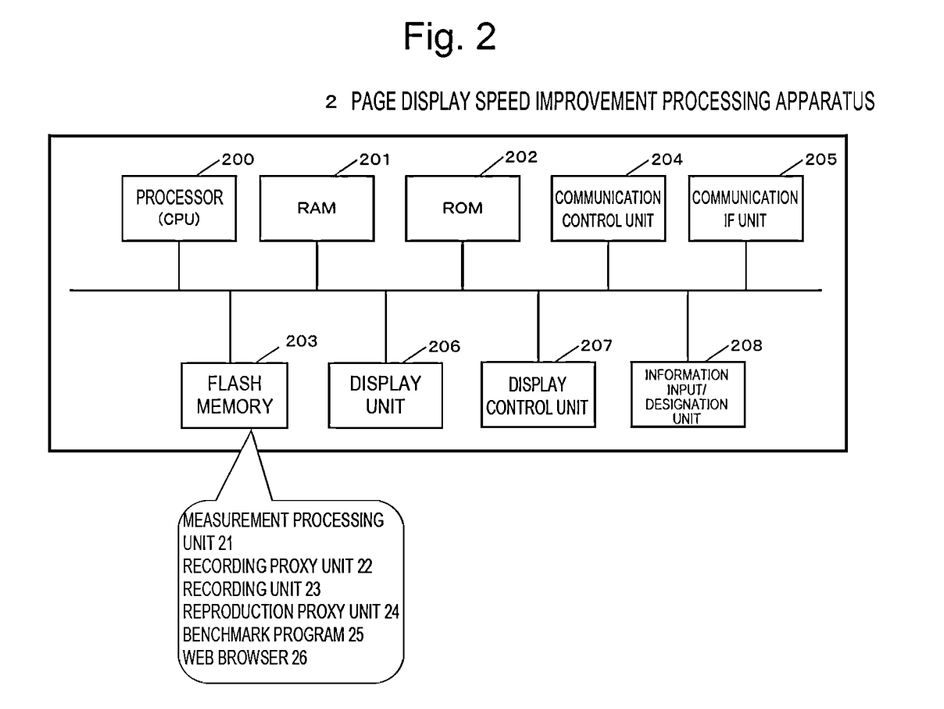
FIG. 2 is a diagram illustrating a configuration and functions of a page display speed improvement processing apparatus according to the embodiment.

To describe it in more detail, the page display speed improvement processing apparatus 2 in the page display speed improvement processing system 1 described above includes hardware components as illustrated in FIG. 2.

That is, the page display speed improvement processing apparatus 2, i.e. an information processing apparatus, is provided with the hardware components including a central processing unit (CPU) 200 as a processor, a random access memory (RAM) 201 as a work memory, and a read-only memory (ROM) 202 that stores a boot program for startup.

The page display speed improvement processing apparatus 2 is further provided with a non-volatile flash memory 203 that rewritably stores an operating system (OS), application programs, and various types of information (including data), a communication control unit 204 having a wireless and wired data communication function, and a communication interface (IF) unit 205 such as a network interface card (NIC).

The page display speed improvement processing apparatus 2 is further provided with a display unit 206 including a display (liquid crystal display (LCD)), a display control unit 207, and an information input/designation unit 208 including a numeric keypad, various kinds of function buttons (keys), a pointer, a cursor feeder, and the like.

The page display speed improvement processing apparatus 2 is provided with a measurement processing unit 21, a recording proxy unit 22, a recording unit 23, a reproduction proxy unit 24, a benchmark program 25, and a Web browser 26 as functional components as described later in detail. Here, the benchmark program 25 and the Web browser 26 are stored in the flash memory 203.

In one example, in order to logically realize the other functional components (21 to 24) described above in the page display speed improvement processing apparatus 2, a page display speed improvement processing program is installed into the flash memory 203 as an application program. Then, in the page display speed improvement processing apparatus 2, the processor (CPU) 200 deploys and executes the page display speed improvement processing program in the RAM 201 upon an instruction from an operator or power turned on. The page display speed improvement processing program carries out page display speed improvement processing as described later in detail, in cooperation with the hardware components described above.

Specific configurations of the Web server 3 and the viewer terminal 4 in the page display speed improvement processing system 1 described above is not shown because one skilled in the art can easily understand and implement such configurations.

[Details of Page Display Speed Improvement Processing Apparatus]

Next, the page display speed improvement processing apparatus 2 that performs the page display speed improvement processing will be described in more detail with reference to FIGS. 1 and 2, and related figures (FIGS. 3 to 9) together.

The page display speed improvement processing apparatus 2 in the page display speed improvement processing system 1 shown in FIG. 1 is provided to improve the display speed of Web pages provided for the viewer terminal 4 from the Web server 3 operating/managing Web sites.

In general, a Web site is a collection of Web pages and various types of resources in the same domain, and the plurality of Web pages on the Web site include a home page and linked pages in the same domain. For example, if a URL used for specifying a Web server 3 or a document and various types of resources existing on the Web is "https://www.xxxxx.co.jp", the part "www.xxxxx.co.jp" indicates a domain (i.e., a domain name of the Web server 3).

A common Web page includes a plurality of types of resources, such as documents and images, in a form of being referred to, and a viewer can view a desired Web page in a Web browser, which is viewing software of the viewer terminal 4, after the Web browser has finished loading these resources from a corresponding Web server 3 when the Web server 3 is operating.

Many types of resources include at least (a), (b), (c), and (d) described below as resource information:
 (a) A document written in a predetermined markup language (for example, Hyper Text Markup Language (HTML)) and including a design concept (an architecture) of an overall configuration (which may also be referred to as an HTML document or HTML document data).
 (b) A Cascading Style Sheet (CSS) as a document designing a style. The CSS includes information (codes) for setting a style of a Web page and, for example, is used to selectively set a style (such as the color and size of the text) for HTML elements.
 (c) A program operating on a Web browser. For example, by using JavaScript, actions and effects that cannot be expressed with HTML or CSS can be specified.
 (d) A still image and/or a moving image (which may be also referred to as image data).

The HTML document data of the resource (a) described above is acquired from a particular Web server 3 specified by a URL. A simple Web page may be complete with at least one type of resource provided from the particular Web server 3 from which the HTML document data has been acquired. A common Web page, however, may include the above-described plurality of types of resources (a), (b), (c), and (d) as resource information in a form of referring to servers other than a Web server 3 from which the HTML document data has been acquired, and the Web page is effectively visibly displayed thereby.

Figure 3:
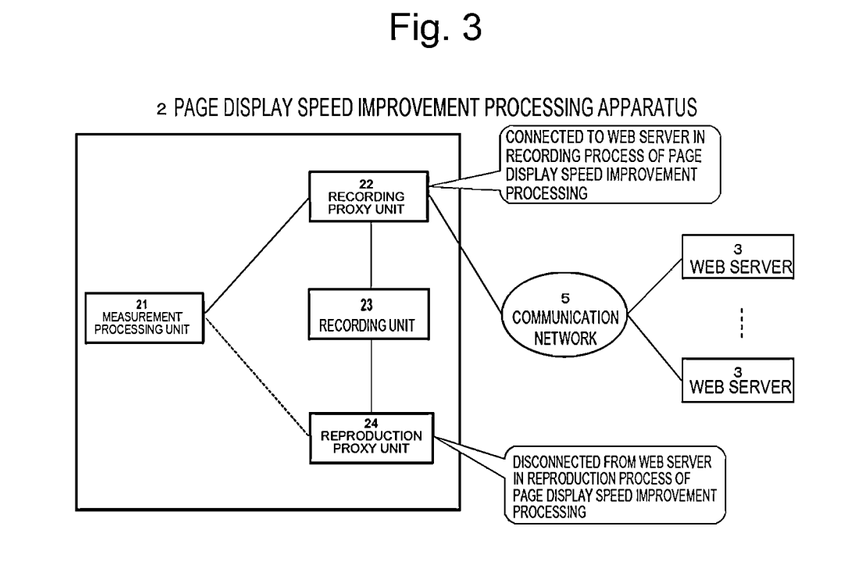
FIG. 3 is a diagram illustrating details of the display speed improvement processing apparatus according to the embodiment.

Referring to FIG. 3, the page display speed improvement processing apparatus 2 is provided with the measurement processing unit 21, the recording proxy unit 22, the recording unit 23, and the reproduction proxy unit 24 as functional components.

The measurement processing unit 21 is connected to the recording proxy unit 22 in a recording process of the page display speed improvement processing, and is switched to connect to the reproduction proxy unit 24 in a reproduction process of the page display speed improvement processing.

It is an important point that the page display speed improvement processing apparatus 2 keeps connection with a Web server 3 that provides a Web page targeted to improve display speed (which may be referred to simply as a display speed improvement target page) via the communication network 5 only in the recording process of the page display speed improvement processing, but is disconnected from the Web server 3 in the reproduction process of the page display speed improvement processing.

The measurement processing unit 21 of the page display speed improvement processing apparatus 2 has a measurement function of acquiring resource information about at least one type of resource constituting a display speed improvement target Web page, from a Web server 3 through communication with the Web server 3, and determining a display-speed-related indicator for evaluating display speed of the whole display speed improvement target Web page based on time information related to the acquisition of the resource information.

Figure 4:
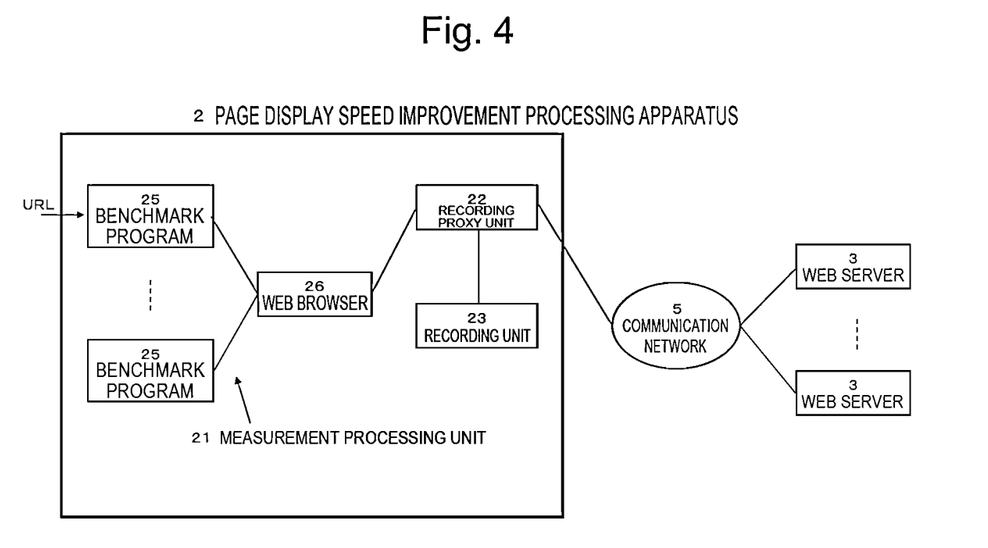
FIG. 4 is a diagram illustrating details of the page display speed improvement processing apparatus according to the embodiment.

As illustrated in FIG. 4, the measurement processing unit 21 can adopt a configuration that includes a plurality of (strictly, a plurality of types of) benchmark programs 25 and the Web browser 26. When the measurement processing unit 21 includes a plurality of benchmark programs 25, pre-defined benchmark programs 25 sequentially work in cooperation with the Web browser 26 according to a measurable indicator (the display-speed-related indicator).

Figure 9:
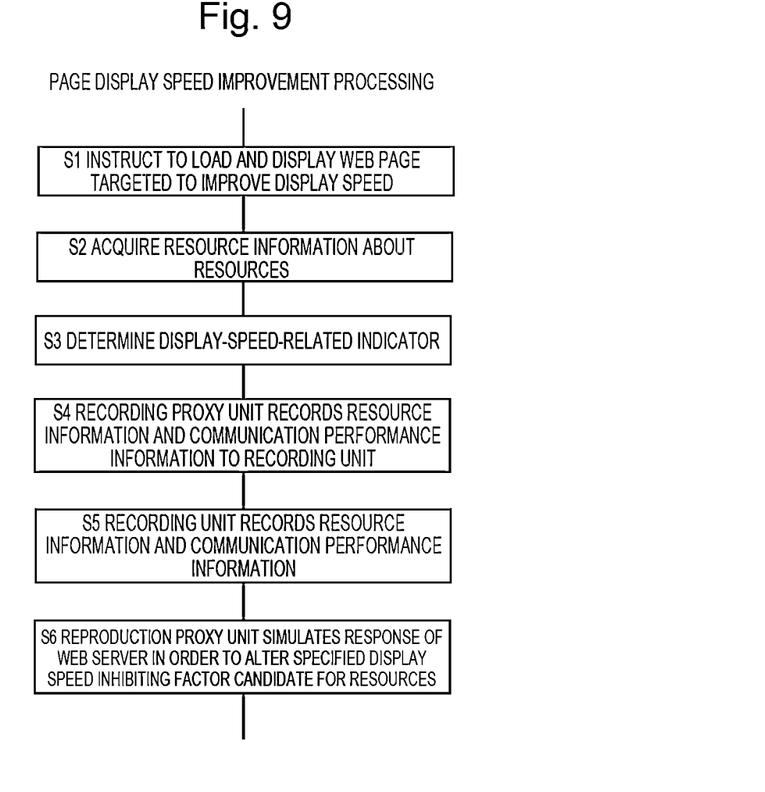
FIG. 9 is a diagram illustrating page display speed improvement processing according to the embodiment.

Particular benchmark programs 25 constituting the measurement processing unit 21 instruct the Web browser 26 to load and display a display speed improvement target Web page, upon an operator's instruction (for example, input of a requested URL) (see process S1 in FIG. 9). The Web browser 26 acquires resource information about resources constituting the display speed improvement target Web page from the Web server 3 through communication with the Web server 3 via the recording proxy unit 22 (see process S2 in FIG. 9). The benchmark programs 25 determine display-speed-related indicators for evaluating the display speed of the whole display speed improvement target Web page based on time information related to the acquisition of the resource information (see process S3 in FIG. 9).

An example of the indicators (the display-speed-related indicators) that can be measured by the benchmark programs 25 is described below. The display-speed-related indicators are time information for evaluating the display speed of the whole display speed improvement target Web page, and are indicators for evaluating the speed perceived by a user (a viewer).

Here, for example, it is predefined that a first benchmark program 25 measures an indicator TTFB, a second benchmark program 25 measures indicators FCP and LCP, and a third benchmark program 25 measures indicators TBT, TTI, and OnLoad. Each benchmark program 25 may store the measured indicators to use the indicators for evaluation in a reproduction processing process.

TTFB (Time to First Byte): time from when a request is made to when a Web server 3 starts responding FCP (First Contentful Paint): time until the first text or image is displayed LCP (Largest Contentful Paint): time until the largest image in the view is displayed TBT (Total Blocking Time): total time of high load that has occurred in the Web browser 26

TTI (Time to Interactive): time until the Web browser 26 shows stable responsiveness OnLoad: time when loading of all the resources constituting the Web page is completed When there are a plurality of display-speed-related indicators (measurement indicators), appropriate benchmark programs are different according to the measurement indicators. Therefore, it is preferable that the measurement processing unit 21 includes a plurality of benchmark programs 25. Thereby, it becomes possible to flexibly respond even when a measurement indicator is added or changed.

The Web browser 26 constituting the measurement processing unit 21 has a function of loading an HTML document of a specified URL and drawing a Web page graphically for a viewer while sequentially loading resources specified to refer to in the HTML document, similarly to a common Web browser. Unlike a common Web browser, the Web browser 26 has an additional function of performing an off-screen operation that is not accompanied by screen output (visible display). The Web browser 26 operates in response to instructions from the benchmark programs 25 and provides information about progress of loading and drawing for the benchmark programs 25 to determine the display-speed-related indicators.

A common Web browser has a general-purpose function (a proxy function) of performing main communication via a specified network host (a proxy). The Web browser 26 constituting the measurement processing unit 21 has this general-purpose function and performs data communication in a Web page load process through the recording proxy unit 22.

The recording proxy unit 22 individually identifies each of resources constituting a display speed improvement target page in a process of communication with the Web servers 3 by the measurement processing unit 21. Then, the recording proxy unit 22 acquires resource information about content of the resources and communication performance information including latency (acquisition time) and an average data rate (transmission speed) for each resource and records the information in the recording unit 23 (see process S4 in FIG. 9).

Figure 5:
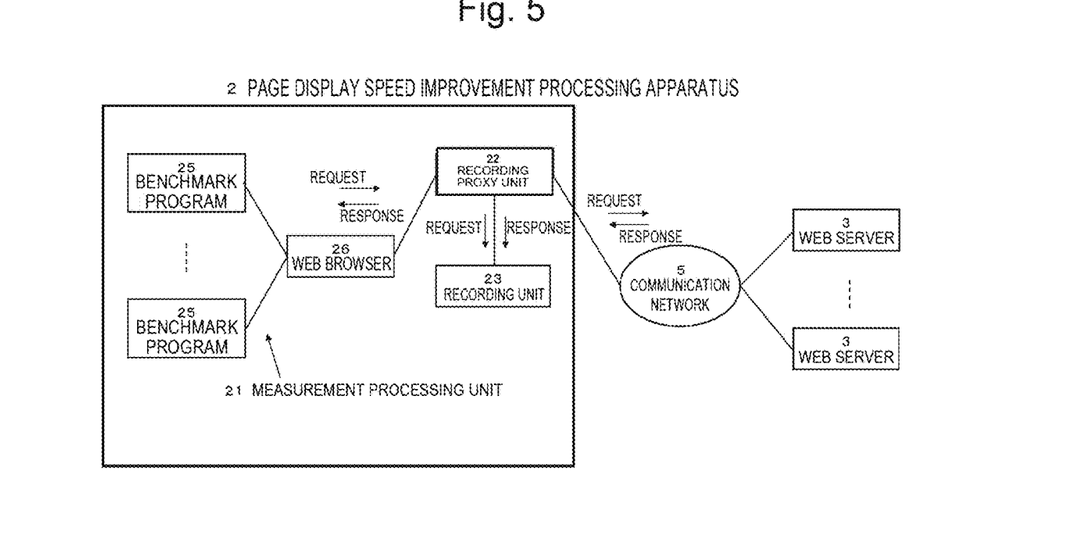
FIG. 5 is a diagram illustrating details of the page display speed improvement processing apparatus according to the embodiment.

As shown in FIG. 5, for each of a plurality of types of resources constituting a Web page, the Web browser 26 constituting the measurement processing unit 21 sends a request to a corresponding Web server 3 and receives a response from the Web server 3 through the recording proxy unit 22. Then, the recording proxy unit 22 records information about the request and the response in the recording unit 23 as a pair.

Communication content of the request from the Web browser 26 to the Web server 3 via the recording proxy unit 22 includes a requested URL (specifying the address of the Web server 3 and/or storage location information about each resource) and an HTTP request method (GET, POST, or the like) as communication content information.

Further, communication content about the response from the Web server 3 to the Web browser 26 via the recording proxy unit 22 includes an HTTP response status code (a numeric code 200, 404, or the like about success or error), an HTTP response header (additional information), and a resource data body (response data) as communication content information.

Communication performance includes latency and an average data rate as communication performance information. The latency (ms) is time after the recording proxy unit 22 receives the request from the Web browser 26 until the Web server 3 responds and starts receiving data. The average data rate (byte/ms) is a transmission speed (a communication speed) and is determined by the recording proxy unit 22 based on an expression of "a data transfer amount at the time of recording/(data reception completion time−data reception start time)."

Figure 6:
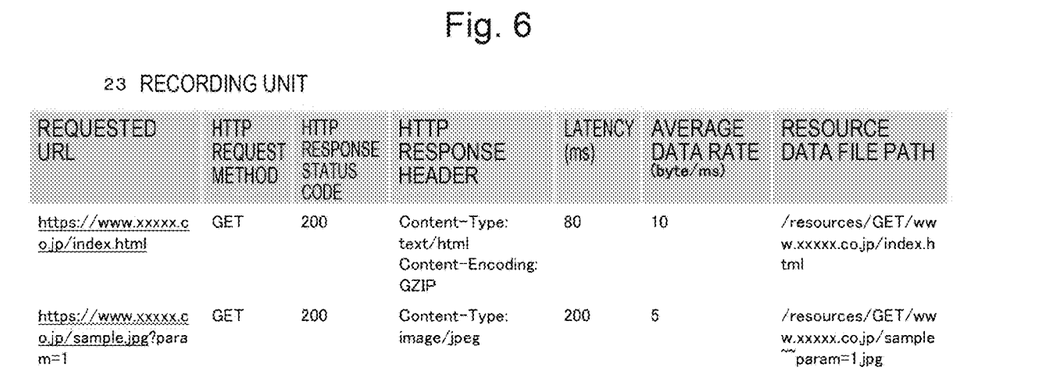
FIG. 6 is a diagram illustrating details of the page display speed improvement processing apparatus according to the embodiment.

As illustrated in FIG. 6, the recording unit 23 records information about each of a plurality of types of resources such as a requested URL, an HTTP request method, an HTTP response status code, an HTTP response header, latency, an average data rate, and a resource data (response data) file path as a text file structured in the Java Script Object Notification (JSON) format (i.e., a spec.json file). This recording method is an example of implementation, and alternative implementation such as use of a database is also possible.

Further, the recording unit 23 records resource data (response data) of each resource as an individual file together with a file path ((HTTP method)/(URL).(extension)). The recording unit 23 can work in cooperation with the file system of the operating system (OS) to record the information.

Therefore, the recording unit 23 records communication content information including resource information about a plurality of types of resources constituting a display speed improvement target page and communication performance information for each resource, in cooperation with the measurement processing unit 21 and the recording proxy unit 22 (see process S5 in FIG. 9).

In order to improve the display speed of a Web page, it is necessary to partially optimize each of the plurality of types of resources (a), (b), (c), and (d) described above. Specifically, by reducing at least one of HTML document data, style settings by CSS, action settings by JavaScript, and image data, or the like, it becomes possible to optimize candidates for display speed inhibiting factor.

In order to partially optimize each resource, the measurement processing unit 21 repeatedly tests influence on the display speed of the whole Web page by change in a response from a Web server 3, by executing reproduction processing in cooperation with the reproduction proxy unit 24, in a reproduction process of the page display speed improvement processing.

In one example, the measurement processing unit 21 performs alteration using a text editor for a test file structured in the JSON format, and performs alteration using a text editor and any application software such as graphic software for resource data stored in an individual file in a general-purpose format.

Figure 7:
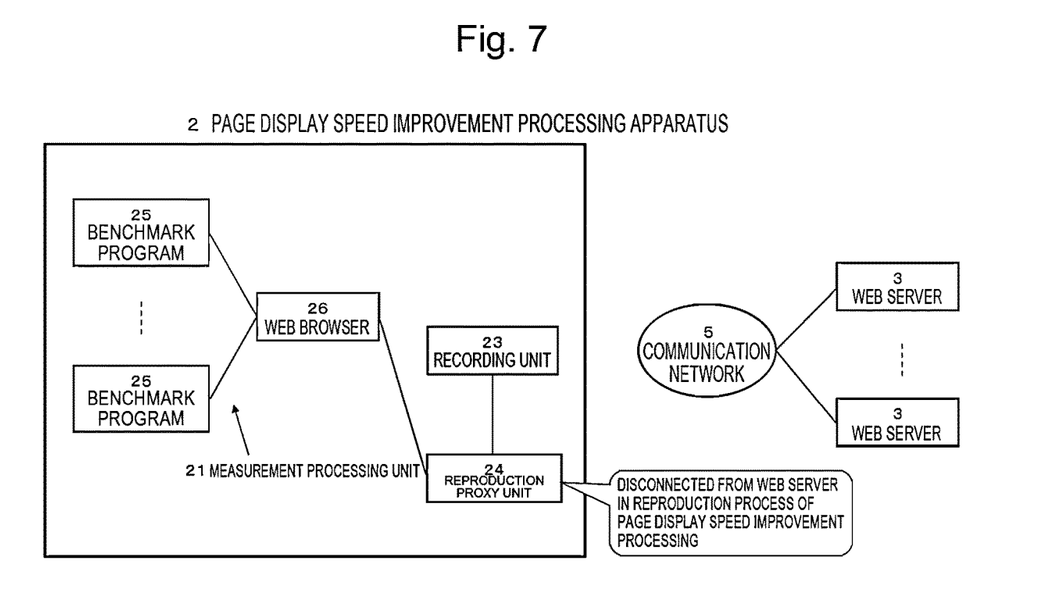
FIG. 7 is a diagram illustrating details of the page display speed improvement processing apparatus according to the embodiment.

Referring to FIG. 7, all data transmission with the Web servers 3 by the Web browser 26 having a general-purpose function of a Web browser is performed via the reproduction proxy unit 24. Here, an important point is that the reproduction proxy unit 24 simulates a response of a Web server 3 based on recorded content of the recording unit 23 without connecting to the communication network 5 and the Web server 3.

That is, the reproduction proxy unit 24 simulates a response of a Web server 3 in cooperation with the measurement processing unit 21 in order to alter specified candidates for display speed inhibiting factor for a plurality of types of resources, based on the recorded content (the communication content information and the communication performance information) of the recording unit 23, in the reproduction processing process without connection to the Web server 3 (see process S6 in FIG. 9).

In more detail, in order to partially optimize each resource, the plurality of benchmark programs 25 and the Web browser 26 constituting the measurement processing unit 21 repeatedly tests influence on the display speed of the whole Web page due to change in a response from a Web server 3, by executing the reproduction processing for altering a display speed inhibiting factor resource based on the recorded content of the recording unit 23 (the communication content information and the communication performance information) in cooperation with the reproduction proxy unit 24, in the reproduction process of the page display speed improvement processing. Then the plurality of benchmark programs 25 measure and display the display-speed-related indicators each time the test is repeated. It becomes possible for an operator to evaluate the appropriateness (effect) of alteration based on the display.

Figure 8:
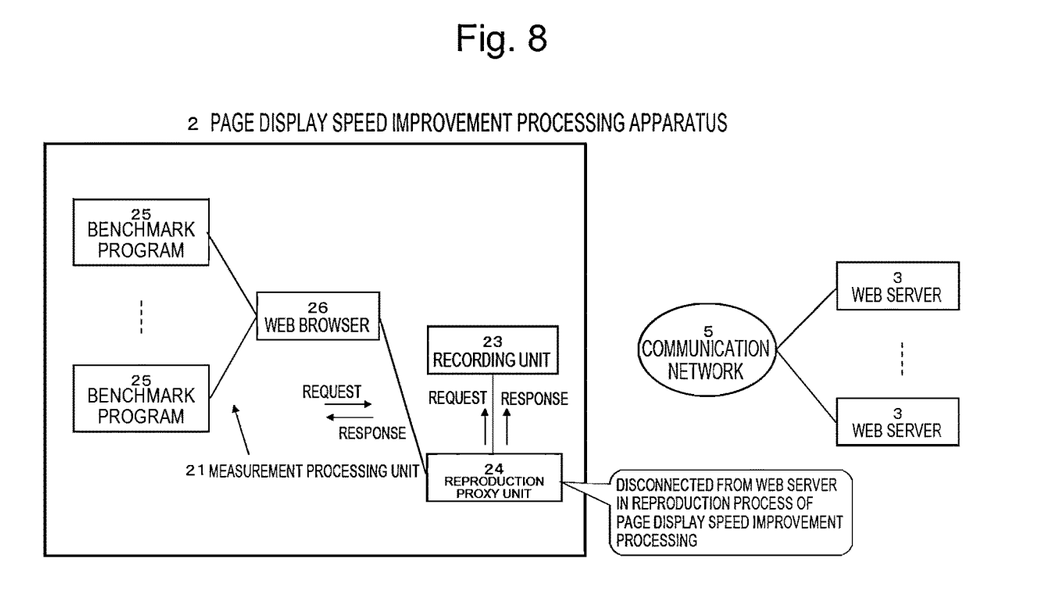
FIG. 8 is a diagram illustrating details of the page display speed improvement processing apparatus according to the embodiment.

Referring to FIG. 8, the reproduction proxy unit 24 repeatedly performs the following processes according to each specified candidate for display speed inhibiting factor, in the reproduction process of the page display speed improvement processing.

[Process 81] The reproduction proxy unit 24 searches for a resource from the JSON file in the recording unit 23 based on a request URL and an HTTP request method included in a request from the Web browser 26 constituting the measurement processing unit 21.

[Process 82] If the resource cannot be found by the search, the reproduction proxy unit 24 returns an HTTP response status code 404 to the Web browser 26 as a response indicating that the resource does not exist. If the resource can be found by the search, the reproduction proxy unit 24 waits for waiting time corresponding to time recorded as latency in the JSON file in order to reproduce response time of a corresponding Web server 3.

[Process 83] After the waiting time, the reproduction proxy unit 24 returns the HTTP response status code 200 to the Web browser 26 as a response indicating that the resource exists.

[Process 84] Then, the reproduction proxy unit 24 returns an HTTP response header to the Web browser 26. At this time, a content length in the HTTP response header is rewritten to the file size of the resource data file.

[Process 85] Further, the reproduction proxy unit 24 returns a resource data body to the Web browser 26.

In implementation of Processes 81 to 85 described above, the reproduction proxy unit 24 causes the waiting time to accurately occur to adjust the speed so that the average data rate is not exceeded. Specifically, the reproduction proxy unit 24 transmits data by dividing the data into small chunks, and provides waiting time between the chunks.

When the above-described page display speed improvement processing (see processes S1 to S6 in FIG. 9) ends in the page display speed improvement processing apparatus 2, a report for reflecting altered content on the display speed improvement target page is made for the operator of the Web servers 3.

Features and Effects of One Embodiment

The page display speed improvement processing apparatus 2 in one embodiment described above includes: the measurement processing unit 21 that acquires resource information about at least one type of resource constituting a display speed improvement target Web page, from the Web server 3 through communication with the Web server 3, and determines a display-speed-related indicator for evaluating display speed of the whole display speed improvement target Web page based on time information related to the acquisition of the resource information; and the recording proxy unit 22 that acquires the resource information about the at least one type of resource constituting the display speed improvement target Web page and communication performance information including acquisition time and transmission speed for each resource, and records the resource information and the communication performance information in the recording unit 23, in a process of communication with the Web server 3 by the measurement processing unit 21.

Further, the page display speed improvement processing apparatus 2 includes: the recording unit 23 that records the resource information and the communication performance information via the recording proxy unit 22; and the reproduction proxy unit 24 that simulates a response of the Web server 3 in cooperation with the measurement processing unit 21 in order to alter candidate for a specified display speed inhibiting factor for the at least one type of resource, based on recorded content of the recording unit 23, in the reproduction processing process without connection to the Web server 3.

Thereby, it becomes possible to improve the display speed of a Web page itself provided for a viewer terminal 4 from a Web server 3 while preventing or reducing influence on the operating Web server 3.

Further, in the page display speed improvement processing apparatus 2 in the embodiment described above, the measurement processing unit 21 can adopt a configuration that includes a plurality of benchmark programs 25 and the Web browser 26. Thereby, it becomes possible to flexibly respond even when a display-speed-related indicator (a measurement indicator) is added or changed.

Modifications

The processes in the embodiment described above are provided as a computer-executable program and can be provided through a non-transitory computer-readable storage medium such as a CD-ROM and a flexible disk and, furthermore, a communication line.

Further, as for the processes in the embodiment described above, some or all of them can be selected, combined, and implemented.

DESCRIPTION OF THE REFERENCE NUMERALS 1 page display speed improvement processing system
2 page display speed improvement processing apparatus
3 Web server
4 viewer terminal
5 communication network
21 measurement processing unit
22 recording proxy unit
23 recording unit
24 reproduction proxy unit
25 benchmark program
26 Web browser

The invention claimed is:

1. A page display speed improvement processing apparatus that improves display speed of a Web page provided for a viewer terminal from a Web server, the page display speed improvement processing apparatus comprising:
a memory configured to store executable instructions; and
a processor connected to the memory and configured to execute the instructions and to store computer-executable components comprising:
a measurement processing unit configured to acquire resource information about at least one type of resource constituting a display speed improvement target Web page, from the Web server through communication with the Web server, and determines a display-speed-related indicator for evaluating display speed of the whole display speed improvement target Web page based on time information related to the acquisition of the resource information;
a recording proxy unit configured to acquire the resource information about the at least one type of resource constituting the display speed improvement target Web page and communication performance information including acquisition time and transmission speed for each resource, and records the resource information and the communication performance information in a recording unit, in a process of communication with the Web server by the measurement processing unit;
a recording unit configured to record the resource information and the communication performance information via the recording proxy unit; and
a reproduction proxy unit configured to confirm a result of performing alteration of a specified candidate for display speed inhibiting factor for the at least one type of resource by simulating a response of the Web server based on recorded content of the recording unit, in cooperation with the measurement processing unit, in a reproduction processing process without connection to the Web server, wherein
the measurement processing unit includes a Web browser and at least one a plurality of predefined benchmark programs that work sequentially in cooperation with the Web browser according to the display-speed-related indicator,
one of the predefined benchmark programs instructs the Web browser to load the display speed improvement target Web page,
the Web browser acquires the resource information about the at least one type of resource constituting the display speed improvement target Web page from the Web server through communication with the Web server via the recording proxy unit, and
each of the predefined benchmark programs determines the display-speed-related indicator for evaluating the display speed of the whole display speed improvement target Web page based on the time information related to the acquisition of the resource information.

2. The page display speed improvement processing apparatus according to claim 1,
wherein when the display speed improvement target Web page includes a plurality of types of resources, the plurality of types of resources include at least two or more among a document written in a predetermined markup language, information on setting a style of the Web page, a program specifying actions, and an image.

3. A page display speed improvement processing method that improves display speed of a Web page provided for a viewer terminal from a Web server, and that, when a processor executes executable instructions stored in a memory, the page display speed improvement processing method comprises:
a measurement processing unit acquiring resource information about at least one type of resource constituting a display speed improvement target Web page, from the Web server through communication with the Web server, and determines a display-speed-related indicator for evaluating display speed of the whole display speed improvement target Web page based on time information related to the acquisition of the resource information, a recording proxy unit acquiring the resource information about the at least one type of resource constituting the display speed improvement target Web page and communication performance information including acquisition time and transmission speed for each resource, and records the resource information and the communication performance information in a recording unit, in a process of communication with the Web server by the measurement processing unit, a recording unit recording the resource information and the communication performance information via the recording proxy unit, and a reproduction proxy unit confirming a result of performing alteration of a specified candidate for display speed inhibiting factor for the at least one type of resource by simulating a response of the Web server based on recorded content of the recording unit, in cooperation with the measurement processing unit, in a reproduction processing process without connection to the Web server, wherein the measurement processing unit includes a Web browser and a plurality of benchmark programs that work sequentially in cooperation with the Web browser according to the display-speed-related indicator, one of the predefined benchmark programs instructs the Web browser to load the display speed improvement target Web page, the Web browser acquires the resource information about the at least one type of resource constituting the display speed improvement target Web page from the Web server through communication with the Web server via the recording proxy unit, and each of the predefined benchmark programs determines the display-speed-related indicator for evaluating the display speed of the whole display speed improvement target Web page based on the time information related to the acquisition of the resource information.

4. The page display speed improvement processing apparatus according to claim 1, wherein one of the predefined benchmark programs measures a time from when a request is made to when the Web server starts responding.

5. The page display speed improvement processing apparatus according to claim 1, wherein one of the predefined benchmark programs measures time until a first text or image is displayed and time until a largest image in a view is displayed.

6. The page display speed improvement processing apparatus according to claim 1, wherein one of the predefined benchmark programs measures total time of high load that has occurred in the browser, time until the browser shows stable responsiveness, and a time of completion of loading all resources constituting the web page.

7. The page display speed improvement processing method according to claim 3, wherein one of the predefined benchmark programs measures a time from when a request is made to when the Web server starts responding.

8. The page display speed improvement processing method according to claim 3, wherein one of the predefined benchmark programs measures time until a first text or image is display and time until a largest image in a view is displayed.

9. The page display speed improvement processing method according to claim 3, wherein one of the predefined benchmark programs measures total time of high load that has occurred in the browser, time until the browser shows stable responsiveness, and a time of completion of loading all resources constituting the web page.

* * * * *